US007606864B2

(12) United States Patent
Koch

(10) Patent No.: US 7,606,864 B2
(45) Date of Patent: Oct. 20, 2009

(54) SETTING AND DISPLAY OF COMMUNICATION RECEIPT PREFERENCES BY USERS OF MULTIPLE COMMUNICATION DEVICES

(75) Inventor: Robert A. Koch, Norcross, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 862 days.

(21) Appl. No.: 10/993,236

(22) Filed: Nov. 19, 2004

(65) Prior Publication Data

US 2005/0091327 A1 Apr. 28, 2005

Related U.S. Application Data

(63) Continuation-in-part of application No. 09/709,038, filed on Nov. 10, 2000.

(51) Int. Cl.
*G06F 15/16* (2006.01)
*G06F 7/00* (2006.01)
*G06F 17/00* (2006.01)
(52) U.S. Cl. .................... 709/206; 707/104.1; 709/227
(58) Field of Classification Search ................ 455/440; 370/260–261; 707/104.1; 709/203, 206, 709/227
See application file for complete search history.

(56) References Cited

U.S. PATENT DOCUMENTS

| 5,471,616 | A  | * | 11/1995 | Johnson et al. ............... 726/34 |
| 5,652,789 | A  | * | 7/1997  | Miner et al. ........... 379/201.01 |
| 5,689,642 | A  | * | 11/1997 | Harkins et al. .............. 709/207 |
| 5,864,874 | A  | * | 1/1999  | Shapiro ...................... 707/201 |
| 5,928,325 | A  | * | 7/1999  | Shaughnessy et al. ....... 709/206 |
| 6,125,176 | A  | * | 9/2000  | Foladare et al. ........ 379/211.02 |
| 6,148,328 | A  | * | 11/2000 | Cuomo et al. ............... 709/204 |
| 6,463,471 | B1 | * | 10/2002 | Dreke et al. ................. 709/224 |
| 6,564,261 | B1 | * | 5/2003  | Gudjonsson et al. ........ 709/227 |
| 6,678,719 | B1 | * | 1/2004  | Stimmel ..................... 709/204 |
| 6,691,162 | B1 | * | 2/2004  | Wick .......................... 709/224 |
| 6,711,158 | B1 | * | 3/2004  | Kahane et al. .............. 370/352 |
| 6,714,519 | B2 | * | 3/2004  | Luzzatti et al. ............. 370/252 |
| 6,757,833 | B2 | * | 6/2004  | Wakai et al. .................... 726/4 |
| 6,760,754 | B1 | * | 7/2004  | Isaacs et al. ................ 709/206 |
| 6,807,423 | B1 | * | 10/2004 | Armstrong et al. .......... 455/440 |
| 6,920,478 | B2 | * | 7/2005  | Mendiola et al. ............ 709/203 |

* cited by examiner

*Primary Examiner*—George C Neurauter, Jr.
(74) *Attorney, Agent, or Firm*—Scott P. Zimmerman PLLC

(57) ABSTRACT

Methods, systems, devices, and products are disclosed for indicating a preference for receipt of a communication. One such method stores a profile of a member and provides information on the member's profile to a sender of the communication. The information includes a communication receipt preference. The communication receipt preference indicates the recipient's preference for receipt of the communication.

17 Claims, 13 Drawing Sheets

SETTING AND DISPLAY OF COMMUNICATION RECEIPT PREFERENCES BY USERS OF MULTIPLE COMMUNICATION DEVICES

CROSS-REFERENCE TO RELATED APPLICATIONS

This application is a continuation-in-part of the co-pending and commonly assigned U.S. patent application Ser. No. 09/709,038, filed Nov. 10, 2000, entitled "Shared Communication Presence Information," and incorporated herein by reference.

BACKGROUND

This invention relates in general to the field of communications, and in particular, to the field of providing communications presence information.

The telecommunications industry has experienced explosive growth in recent years. A portion of this growth has been driven by the need for individuals and corporations to be in constant, if not immediate, contact with each other. In the past, individuals were satisfied using a wireline telephone that was hardwired and associated with a building or location. As society has become more mobile, users demand telephones and access to information that travels with them sparking the evolution of wireless telephone service.

This need to be in constant communication has aided the development of additional wireless devices, such as, standard and interactive pagers and wireless computers. Electronic mail (Email) which was initially marketed as a way to achieve a paperless environment, has grown to become an additional communications medium with users sometimes choosing to send an Email message instead of or in addition to placing a voice telephone call.

Recently, wireless hand-held devices that function as a cross between a telephone and a computer have grown in popularity. These devices allow a user to receive Email and text messages, as well as data on a variety of subjects such as, for instance, stock quotes from remote sources.

The Internet is a global communications system of linked computers and file servers providing users connected to the Internet information on a practically unlimited number of subjects. Most users connect to the Internet via wireline telephone connections using a personal computer, a modem and services of an Internet Service Provider (ISP) through which access to the Internet is provided. Recently devices have become available that allow remote wireless access to the Internet.

With the multitude of communications devices available, it has become exceedingly difficult to determine which communications device is being used by a party. Choices of communications devices can include wireline telephones, wireless telephones, pagers, Email and Internet appliances. Thus one may have to try to connect to numerous communications devices before reaching the desired party. Additionally contact attempts may be to made to a party at home, work, via an instant message, or via the Internet.

Accordingly, a need exists for systems and methods for presenting the status of communications devices of a user. In addition, a need exists for systems and methods for contacting a user once their communications presence has been determined.

SUMMARY

The exemplary embodiments address the problems such as those described above by providing systems and methods for a shared communication presence information for setting receipt preferences, and broadcasting that preference to a member of a communications circle. Once members set their communications preference, those members can be immediately contacted by other members of the communications circle. Both real time and non-real time communication can occur with a member of the communications circle.

Membership in the communications circle is established by a member completing a profile using an Internet web-based form. The profile is stored in a customer profiles database. The profiles database contains a shared and unshared portion. The shared portion is viewable by all members of the communication circle and displays device availability receipt preferences. Receipt preference settings are established by accessing the unshared portion of the profile and selecting the desired communication devices or mediums. Once saved, the settings are sent out over a communications server. The communications server translates the profile information into a unique code number for each member's profile. A collection of code numbers completes the requirement for membership in the communications circle.

The system includes an interactive member profile accessible through various communication methods, a communications sender adapted to route a contact data message through a communications network to connect to the Internet, a prospective communications recipient adapted to indicate communication receipt preference to other members of the communication circle, a communications server, a database storing information regarding members of the communications circle, and member devices adapted to connect to the Internet.

For example, the communications circle will consist of members A (recipient) and B (sender). The profiles and communications circle form the basis for B's ability to identify A's communications preference status so that B can choose the requested method of communication to initiate communication with A or such that the network can chose for B the best method of communication based on A's communication preference.

The communications server maintains a profile of all communications equipment associated with each member. At any time member A can select their preferred method to receive communications. When member B chooses to initiate a communication with A, the communications server checks all devices listed in A's profile to determine which of those devices are available. Availability is based on A's receipt preferences or it is based on the system's detection of A's real-time presence in the network.

Upon completion of a check of all A's communication devices and preferences, the communications server returns to an Internet web interface a presentation indicating the communications presence of A's communications devices and preferred communication methods. The results are displayed based on current time of day and day of week using A's profile information. B or the network can determine the best way to contact A considering current the time of day and day of week. B has several options for contacting A including initiating a telephone call to A, sending A an instant message and/or an Email message, leaving A a voice mail message or paging A.

For example, member A is in a meeting and does not want to receive phone calls but would rather receive text messages. Member A indicates this text message preference in her profile. Meanwhile, member B wants to contact member A so he checks his profile to see which of member A's communication devices are available. Once he enters the communication circle, he will see member A's active communication devices. However, he will also see the receipt preference that Member A has identified. Member B or the network will then initiate the communication with member A using the preferred method indicated.

Devices can include but is not limited to, for example, a wireline telephone, a wireless telephone, an interactive pager, electronic messaging, an interactive television (TV), a personal computer (PC) having dial-up access to the Internet or a Pocket PC.

The exemplary embodiments include methods of indicating a preference for receipt of a communication. A profile of a member is stored, and the profile identifies at least one contact device for the member. Information on the member's profile is provided to a sender of the communication. A communications presence of the contact device is tracked for the member, the tracking including determining the availability of the contact device for the member. A communication receipt preference is provided to the sender of the communication. The communication receipt preference indicates the member's preference for receipt of the communication.

The exemplary embodiments also include systems for indicating a preference for receipt of a communication. The system comprises a processor and a database. The processor and the database may be included within a computer, such as a server, or the processor may communicated or couple with the database via a network. The database stores a profile of a member, and the profile identifies at least one contact device for the member. A server retrieves the member's profile from the database and provides information on the member's profile to a sender of the communication. The server tracks a communications presence of the contact device for the member, including determining the availability of the contact device for the member. The server also provides a communication receipt preference to the sender of the communication. The communication receipt preference indicates the member's preference for receipt of the communication. Using the communication receipt preference, the sender can initiate contact with the member according to the preference for receipt of the communication.

The exemplary embodiments also include a computer program product. This computer program product comprises a computer readable medium including instructions. These instructions perform storing a profile of a member, with the profile identifying at least one contact device for the member. Information on the member's profile is provided to a sender of the communication. A communications presence of the contact device is tracked for the member, the tracking including determining the availability of the contact device for the member. A communication receipt preference is provided to the sender of the communication. The communication receipt preference indicates the member's preference for receipt of the communication.

BRIEF DESCRIPTION OF THE DRAWINGS

The accompanying drawings, which are incorporated in and form a part of the specification, illustrate preferred embodiments of the present invention and, together with the description, disclose the principles of the invention.

DETAILED DESCRIPTION

Reference will now be made in detail to preferred embodiments of the invention, examples of which are illustrated in the accompanying drawings. Wherever possible, the same reference numbers will be used throughout the drawings to refer to the same or like parts.

I. Overview of Systems and Methods

Figure 1:
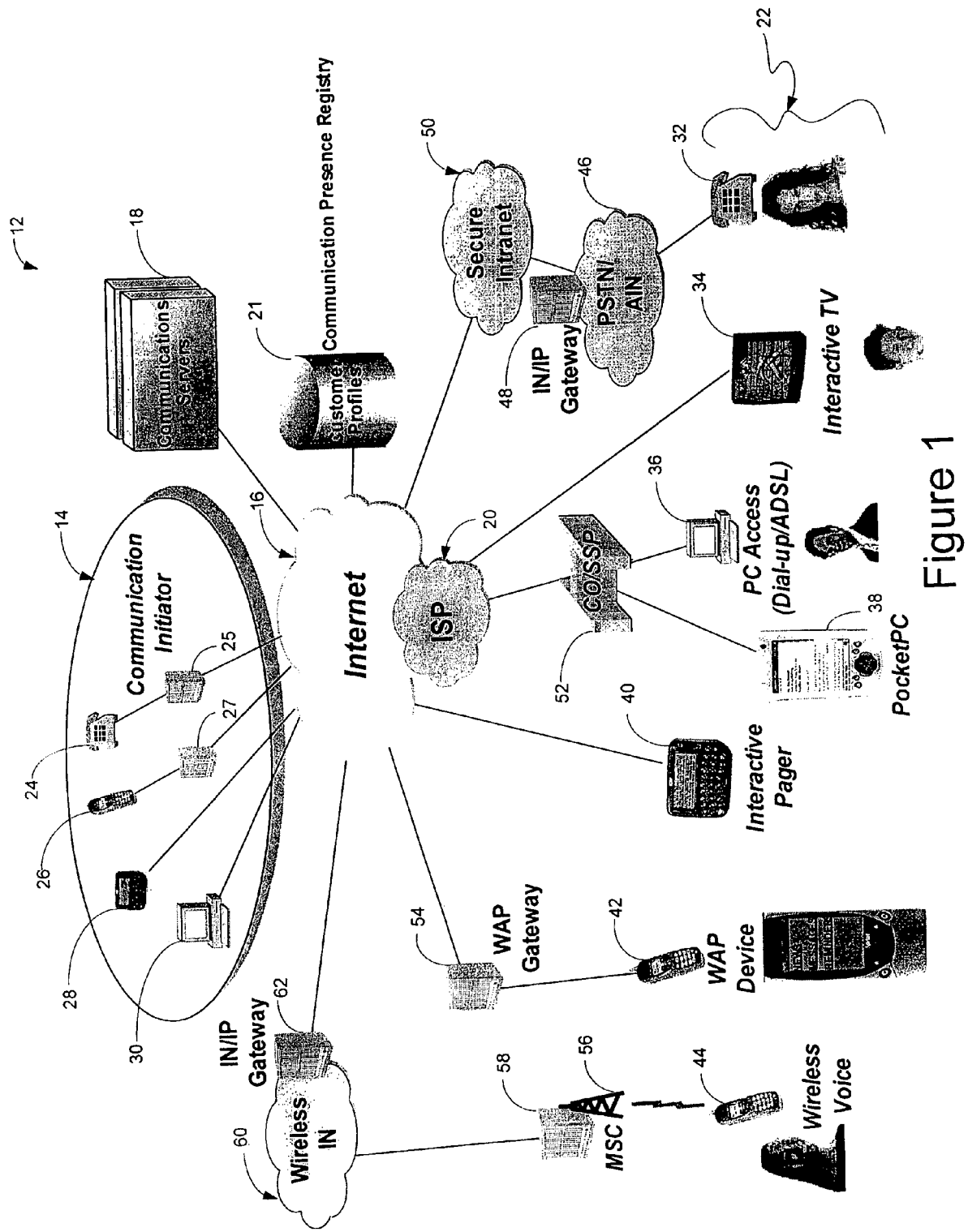
FIG. 1 is an overview diagram of an architecture of a shared communication presence information system in accordance with a preferred embodiment of the invention.

FIG. 1 is an overview diagram of an architecture for providing a shared communication presence information system 12 in accordance with the preferred embodiment of the invention. The system 12 includes a user utilizing any one of several communications initiators 14 to determine the communications presence of a member of their communications circle. Upon determining the communications presence of a member of the communications circle, that member can be immediately contacted utilizing this system 12.

The architecture includes the communications initiator 14 adapted to connect to the Internet 16, a processor 18, for instance a communications server, a customer profiles database 21, an Internet Service Provider (ISP) 20 and a plurality of people and contact devices (collectively referred to as contacts) 22 reachable through the Internet 16.

The communications initiator 14 can be any type of device that can connect to the Internet 16. As shown in FIG. 1, the communications initiator 14 can be a wireline telephone 24 connected to a telephone company central office 25 and a voice XML gateway 25 that provides an interface to the Internet 16, a WAP-enabled telephone 26 connected to a WAP gateway 27 providing access to the Internet 16, a two-way alpha pager 28 such as an interactive pager, and a personal computer (PC) 30 adapted to communicated directly with the Internet 16. For the purposes of this description, the communications initiator 14 will be the PC 30 that accesses the Internet 16 through the ISP 20. Accordingly, the screen shots and interfaces shown for the communications initiator 14 are PC-based and represent those from a web browser. It should be understood that the screen shots and interfaces for the communications initiator 14 will vary with the type of device. For example, the WAP-enabled telephone 26 would have smaller and more concise displays than that of the PC 30.

The contacts or contact devices 22 include any type of communications or data device. The contact devices include but are not limited to, for instance, a wireline telephone 32, an interactive television (TV) 34, a PC 36 having dial-up or DSL access, a Pocket PC 38, other suitable hand-held mobile communications or data devices, an interactive pager 40, a wireless application protocol (WAP) device 42 and a wireless voice telephone 44. A WAP device 42 is a specialized version of a wireless telephone. The WAP device 42 includes a screen having scroll capabilities for reading text messages. For instance, a text message could state check stock quotes. A user enters a stock symbol using the keypad of the WAP device 42. The WAP device 42 forwards the request to a WAP gateway 54 that serves to interface with the ISP 20 for the WAP device 42 and the contact is routed through the Internet 16. The WAP device 42 accesses the Internet 16 to retrieve the current quote from the appropriate source. The Pocket PC 38 generally encompasses a smaller sized personal computer equipment with Microsoft Windows CE and computer programs such as Microsoft Pocket Word, Pocket Excel, and Pocket Internet Explorer. In addition, Email messages can be sent and received by the Pocket PC 38 using Microsoft Pocket Inbox. The invention is not limited to these form of contact devices 22 and any suitable equipment capable of accessing the Internet 16, directly or indirectly, can be utilized.

For the contact side of the communication, the wireline telephone 32 connects to the Public Switched Telephone Network (PSTN) having Advanced Intelligent Network (AIN) 46 capabilities. The PSTN/AIN 46 couples to an IN/IP gateway 48. The IN/IP gateway 48 includes data switching equipment that translates between the telephony protocols and the Internet protocols. The IN/IP gateway 48 routes contact data messages to a secure intranet 50 that serves as a firewall to protect the PSTN 46 from potential hackers who hack into the Internet 16. The contact data messages are then routed from the secure intranet 50 to the Internet 16.

The interactive TV 34 routes to the Internet 16 via a route selected by a subscriber's ISP 20. The Pocket PC 38 and PC 36 having dial-up access couple to a central office/signal switching point 52 that switches the contact data message to the ISP 20 that connects the contact data message to the Internet 16. The wireless voice telephone 44 connects to a radio tower 56 coupled to a mobile switching center (MSC) 58 equipment that routes the contact data message to wireless IN protocol network 60. The wireless IN network 60 functions similar to the advanced intelligent network utilized in wireline telecommunications. The wireless IN 60 communicates with an IN/IP gateway 62 that routes the contact data message to the Internet 16.

Figure 2:
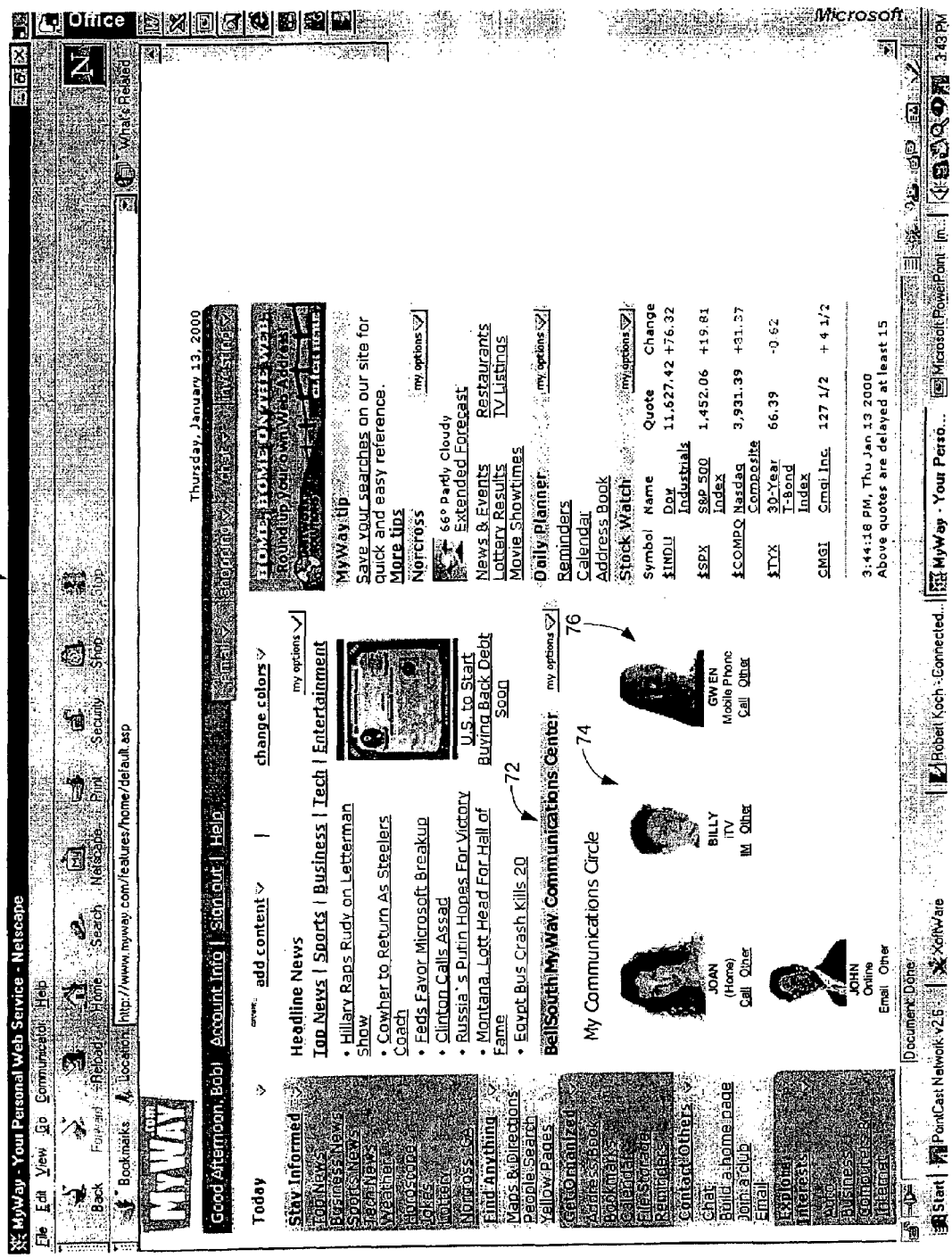
FIG. 2 is an illustrative view of a personalized Internet interface that provides a display and access to the system of FIG. 1.

FIG. 2 presents an illustrative view of a personalized Internet interface 70 that provides a display and an interface for accessing the system 12 of this invention. This invention is not limited to the display format shown in FIG. 2. A suitable presentation format for displaying the personalized Internet interface 70 for use with this invention is a portal provided by a myway.com page available from MyWay.com and provided to Internet Service Provider BellSouth.net of Atlanta, Ga. Alternatively, a traditional Internet interface can be utilized to display information and provide system access.

The interface 70 can include, for instance, a communications center section 72 displaying the members of the user's communications circle 74. The members of the communications circle 74 are dynamic and can be changed. The members of the communications circle 74 are a subset of the type of contacts 22 shown in the system 12 of FIG. 1. The communications center 72 shows one manner of displaying contact 22 information. Any number of identifying characteristics can be used to identify members of the communications circle 74. For instance, member of the communications circle 74 can be identified by name, picture, potential presence location and type of equipment used.

A user may choose to verify presence information for a member of their communications circle 74 by clicking or otherwise selecting that person, for instance, member Gwen 76. In this example, Gwen 76 has at least a mobile telephone. An example of additional identifying information regarding Gwen 76 is shown in FIG. 3.

Figure 3:
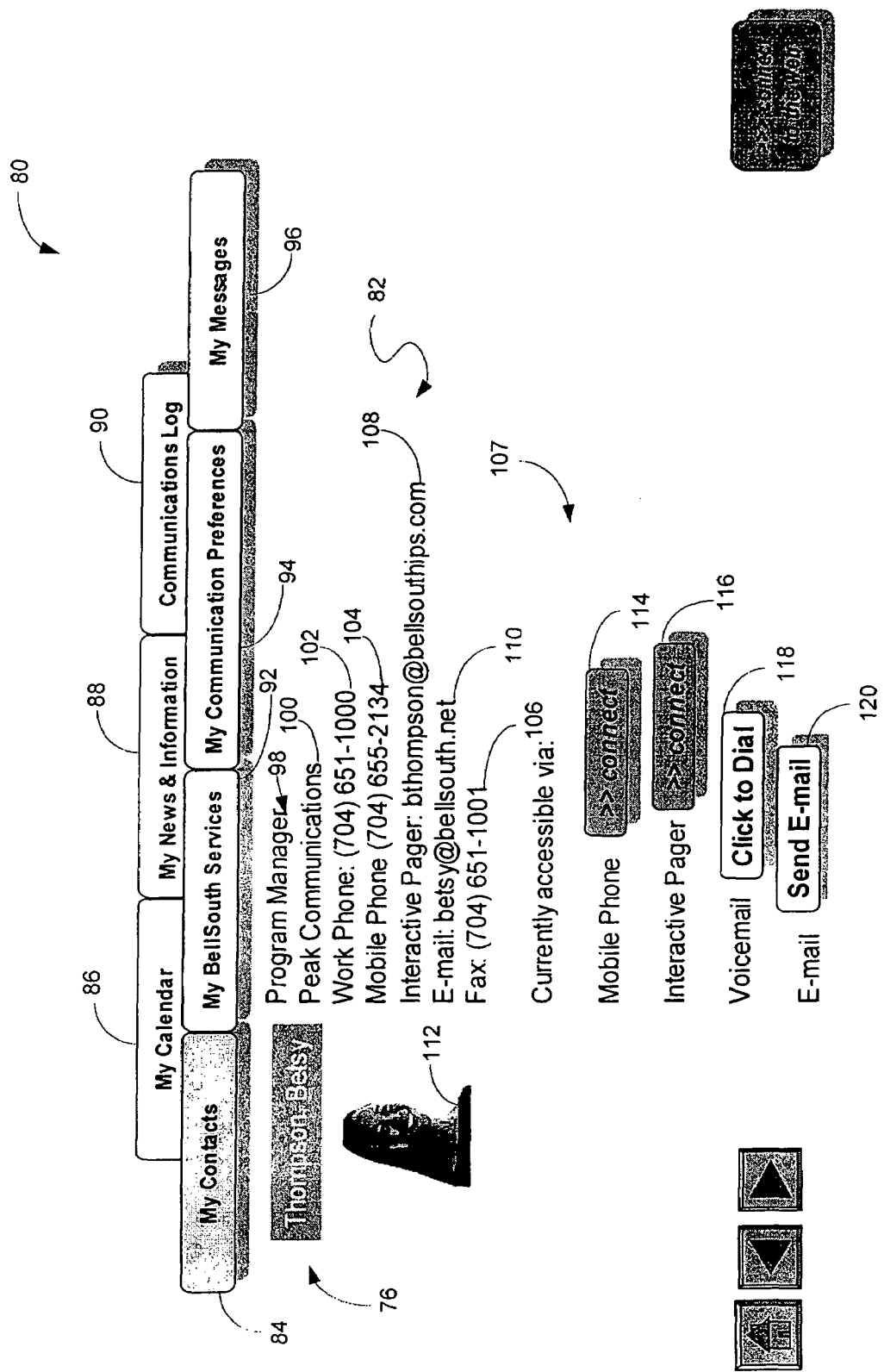
FIG. 3 is an example of a screen display showing profile information for a member of the communications circle identified on a portion of the screen of FIG. 2.

FIG. 3 is an example of a screen display of an interface 80 showing profile information 82 for Gwen 76, a member of the communications circle identified on a portion of the screen of FIG. 2. The profile information 82 is displayed by clicking on tab displaying the term "My Contacts" 84 shown on the screen display 80. Any number of other features can be accessed by clicking their respective tabs, for instance, "My Calendar" 86, "My News & Information" 88, "Communications Log" 90, "My BellSouth Services" 92, "My Communications Preferences" 94 and "My Messages" 94.

By clicking on the tab My Contacts 84, a screen is opened and displays the profile information 82 for Gwen 76. Additionally, a photograph 112 of Gwen 76 can be displayed. For illustrative purposes, the profile information 82 includes the following information about Gwen 76: (1) title of Program Manager 98; (2) name of her company, Peak Communications 100; (3) her work, mobile and facsimile telephone numbers 102, 104 and 106; (4) her interactive pager address 108; and (5) her Email address 110. This profile information 82 can include and resemble information contained on a traditional business card. Information listed in the profile will be gathered by the communications server 18 to determine which of the types of contact devices 22 associated with Gwen 76 are connected to the system 12 and activated or available to receive a contact or telephone call. The communications server 18 gathers communications presence information 107 on each contact device 22 prior to displaying its current accessibility, as shown in the lower portion of the interface 80 of FIG. 3.

Once the server collects communications presence information 107 on all devices 22, the communication initiator 14 intelligently determines the best way to contact Gwen 76. In the example shown in FIG. 3, Gwen's mobile telephone 104, interactive pager 108, voice mail for work 102, and Email 110 are active (i.e. turned on). The communications presence information 107 is preferably time of day and day of week specific. That is, the communications initiator 14 can receive information relevant for the current day. Thus, at the time of the display of the My Contacts 84 information, Gwen 76 is accessible by mobile telephone, interactive pager, voice mail and Email. Gwen's mobile telephone and interactive pager can be accessed by clicking on one of the tabs "connect" 114, 116. To connect to Gwen 76 via voice mail, clicking the tab "Click to Dial" 118 will dial to ring Gwen's 76 telephone, for instance, her work telephone 102 to leave her a voice mail message. An Email message can be sent to Gwen 76 by clicking the tab "Send E-Mail" 120 to connect to Gwen's electronic mail.

II. Shared Communications Presence Information System Setup

A. Establishing Profiles and Communications Circles

Figure 4:
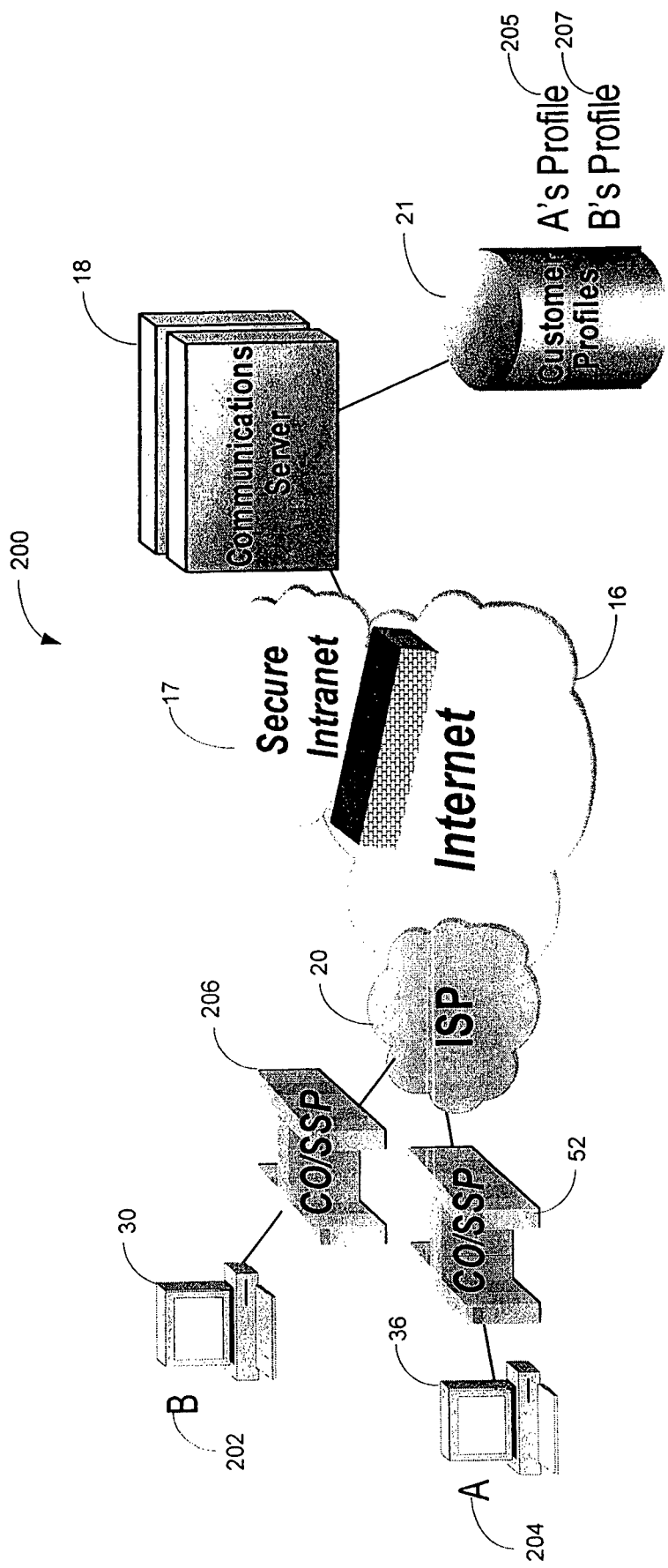
FIG. 4 is a diagram of an architecture for establishing the user profiles of FIG. 3.

FIG. 4 is a diagram of an illustrative architecture 200 for establishing the user profiles, such as those shown in FIG. 3. For simplicity, FIG. 4 shows only two parties, A 204 and B 202, who are members of a communications circle 74 and wish to communicate with each other. However, this invention is not limited to only two members of a communications circle 74.

In this example, Party A 204 and Party B 202 choose to be members of a common communications circle. To facilitate communications between A 204 and B 202, they both complete a profiles form accessible on a web page or by using the personalized Internet interface 70. Parties who wish to be members of the communications circle 74 can include a variety of information on their contact devices 22 and when they are available through the contact devices 22. An example of information included in the profile for A 204 is shown below in Table 1.

TABLE 1

| Home Telephone Number | 7042540010 | M-F 6P-10P Sa-Su |
|---|---|---|
| Work Telephone Number | 7043450020 | M-F 8A-5P |
| Mobile Telephone Number | 8283334434 | |
| SMS Address | 8283334434@company.com | |
| Email Address | custa@bellsouth.net | |
| AlphaPager Address | custa@bellsouthips.net | |
| Mobitex Access Number | 15254678 | |
| Internet DN | 7042540010 | |

Table 1 shows an example of possible profile data that can be stored on A 204. For example, the profile can contain telephone numbers and time of day or day of week that a member will be available at that particular telephone number.

Both A 204 and B 202 complete a profile 205, 207 that is stored in the customer profiles database 21. The communications server 18 generates a random and unique code number for each profile and assigns a code number to each profile 205, 207 stored in the customer profiles database 21. The profiles for A 204 and B 202 are stored in the customer profile database 21 that is coupled to the communications server 18. Each party's communications circle 74 includes code numbers for each member of the communications circle 74. B 202 establishes his communications circle 74 by logging into the communications server 18 to create his communications circle 74 using a form on a web page. The form asks, for instance, for the code numbers for each customer to be included in the circle 74. Table 2 below shows a sample communications circle 74 for B 202.

TABLE 2

Code Number for A
Code Number for C
Code Number for D

A 204 creates a similar communications circle 75. The completed communications circles 74, 75 are stored in the customer profiles database 21. A communications circle for A 203 could include the code numbers for B, E, and F. For B 202 and A 204 to know each other's presence, they exchange code numbers with each other. Further, A 204 and B 202 identify a list of code numbers for members of their communications circle 74. For example, B 202 may want to add A 204 to their circle, as well as, for instance, members C and D, for whom B 202 also knows their code numbers. In addition to exchanging code numbers, parties may also exchange passwords, a key, or other information in order to allow access to each other's profile information. Thus, the communications server 18 may not add someone to a communications circle unless they have the password, key, or other information that proves the party has been given authorization to the party's profile information.

The communications server 18 maintains a profile of all communications equipment associated with each member. When B 202 chooses to initiate a communication with A 204, the communications server 18 checks all contact devices 22 listed in A's profile 205 to determine if those devices 22 are available. Upon completion of a check of all A's contact devices 22, the communications server 18 returns to the Internet web interface 70 a presentation indicating the communications presence of A's contact devices 22. The results are displayed based on current time of day and day of week using A's profile information. B 202 can determine the best way to contact A 204 considering the displayed information. B 204 has the option to initiate a telephone call to A 204, to send A 204 an instant message, to send an Email message, to leave A 204 a voice mail message, or to page A 204.

When B 202 wishes to initiate a communication with A 204, B 202 can use a PC 30 as the communication initiator 14. The PC 30 has dial-up access that connects to the central office 206 and the central office 206 has a signal switching point (CO/SSP) forming part of the Advanced Intelligent Network (AIN) capabilities. The CO/SSP 206 switches the contact data message to the ISP 20 to connect the request to the Internet 16. The contact data message is routed through the Internet 16 through a secure intranet 17 to the communications server 18 which is adapted to communicate with and retrieve profile information from the customer profiles database 21. The secure intranet 17 serves as a firewall to protect the proprietary network elements such as the communications server 18 from potential illegal entry by computer hackers. The customer profiles database 21 includes profile information for both B 202 and A 204. Suitable servers for this invention include a Compact Service Node or Enhanced Media Resource Server by Lucent Technologies.

Figure 5:
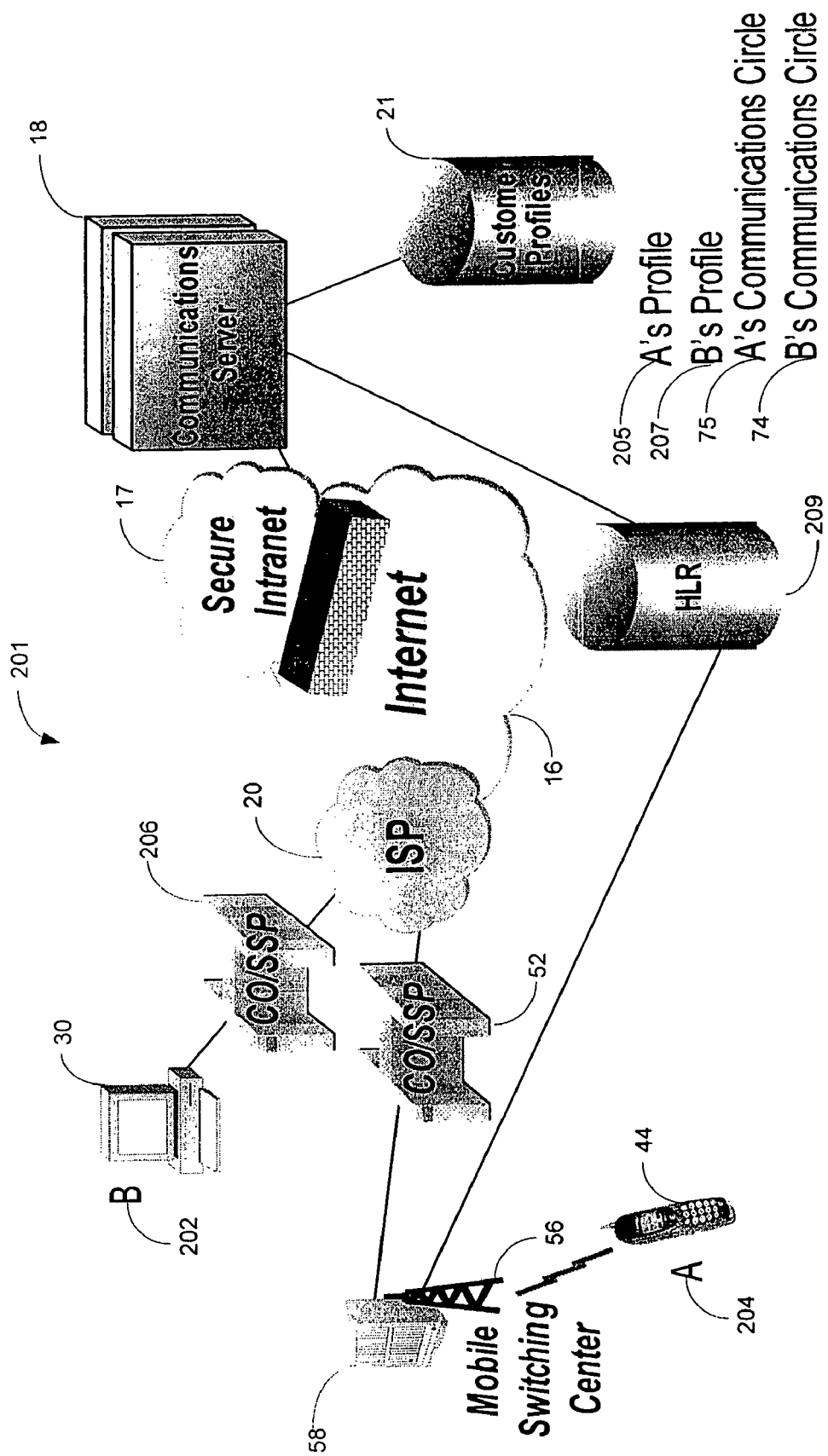
FIG. 5 is an illustration of an architecture for a wireless voice communication system in accordance with the system of FIG. 1.

B 202 can determine the status of A 204 by using the system shown in FIG. 5. When B 202 logs into the personalized Internet interface 70, the communications server 18 retrieves B's communications circle 74 using the customer profiles database 21. B's communications circle 74 contains the list of code numbers, each of which is used as a pointer to find a corresponding profile. For example, B's communications circle 74 contains A's Code Number which is used to find A's profile 205. A's profile 205 is returned to the communications server 18. The communications server 18 now knows where A 204 might be based on the time of day and/or day of week and a list of contact information contained in A's 204 profile 205. A 204 uses for instance, a PC 36, as a contact device 22. However, as mentioned above, a number of other devices can serve as contact devices 22. The PC 36 has dial-up access to the central office/signal switching point 52 that switches the contact data message to the ISP 20 to connect the contact to the Internet 16.

The architecture described above for establishing profiles and communications circles can be utilized for a number of communications devices as described below.

B. Wireless Voice Communication, SMS Communication

B 202 can determine the status of A 204 by using the system 201 shown in FIG. 5. When B 202 logs into the personalized Internet interface 70, the communications server 18 retrieves B's communications circle 74 using the customer profiles database 21. B's communications circle 74 contains the list of code numbers, each of which is used as a pointer to find a corresponding profile. For example, B's communications circle 74 contains A's Code Number which is used to find A's profile 205. A's profile 205 is returned to the communications server 18. The communications server 18 now knows where A might be.

The communications server 18 sends an IS-41 Location-Request message to the Home Location Register (HLR) 209 containing A's mobile telephone number. IS-41 is a standard protocol used in wireless applications. When a wireless telephone 44 is turned on, a request is sent to the HLR 209 alerting it that the wireless telephone 44 is activated and can accept calls. If a telephone call to the wireless telephone 44 is initiated, HLR 209 alerts the wireless telephone to ring because it is available to accept telephone calls. The HLR 209 sends an IS-41 LocationRequest Return Result back to the communications server 18, indicating whether or not A's mobile telephone 44 is turned on.

If A's wireless telephone 44 is turned on, the communications server 18 now knows of the communications presence of A 204 and this status can be displayed to B 202 via the web interface 80. B 202 can thus initiate a call to A's mobile telephone 204 via an Internet Telephony PC client software that allows B's PC 30 to operate as a traditional telephone. Suitable client software entitled Microsoft NetMeeting is available from Microsoft Corporation.

Alternatively, A's mobile telephone 44 can be contacted using a traditional telephone that initiates a normal voice telephone call. In yet another alternative, B 202 may be presented with an indicator, such as a button on the web interface that permits B 202 to click the button to send an Email message to A's Short Message Service (SMS) Email address, thus sending a text message to A's mobile telephone 204. SMS is a specific instance of data communications unique to a wireless device that allows an email based text message to be sent to that device.

If A's wireless telephone 44 is not on or is not recognized by the HLR 209, the communications server 18 can return an option on the web interface 80 to leave A 204 a voice mail message. Alternatively, B 202 may receive a standard "out of range" announcement if a telephone call is placed to A 202.

C. Wireline Voice Communication

Figure 6:
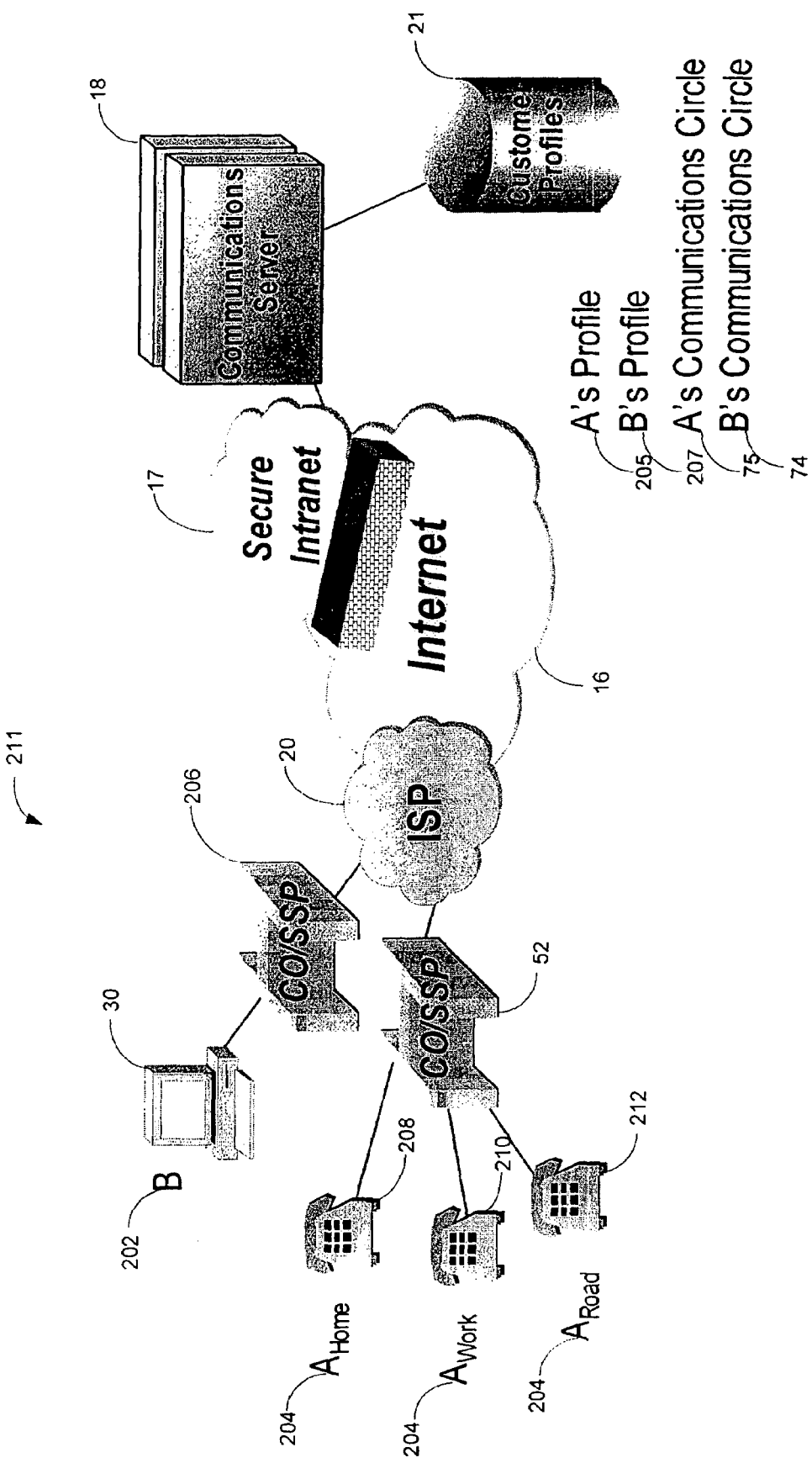
FIG. 6 is an illustration of an architecture for a wireline voice communication system in accordance with the system of FIG. 1.

FIG. 6 is an illustration of an architecture 211 for a wireline voice communication system in accordance with the system of FIG. 1. The wireline telephone equipment is always connected to the network. However, while the wireline telephone is connected, A 204 may not be available to answer the wireline telephone. Thus, in checking A's communications presence, it is important to identify what time of the day and/or day of the week A 204 is available at the wireline telephone.

B 202 would like to initiate a communication with A 204. B 202 uses a PC 30 as the communication initiator 14. The PC 30 has dial-up access that connects to the central office/signal switching point 206 that switches the telephone call to the ISP 20 to connect the request to the Internet 16. The request routes through the Internet 16 to the communications server 18 adapted to communicate with and retrieve profile and communications circle 74, 75 information from a customer profiles database 21. The communications server 18 routes the request through the Internet 16 to the ISP 20 utilized by A 204.

The home or work telephone numbers for A 204 can be displayed to B 202 based on the current time of day and day of the week. For example, A 204 may not actually be at the displayed telephone number, but A 204 has, in effect, stated a preference to B 202, by the hours listed in Table 1 as reach telephone numbers for telephone calls to a wireline telephone. Alternatively, A 204 can set a forward-to number in their profile, for instance, if A 204 is out of town. In another alternative, A 204 can run a web-based calendar application on the communications server 18 that can automatically update reach telephone numbers based on calendar events. B 202 can initiate a call to A 204 via an Internet Telephony PC client, for example, Microsoft NetMeeting. Alternatively, B 202 can initiate a traditional voice telephone call to A 204.

D. Wireline Data Communication

Figure 7:
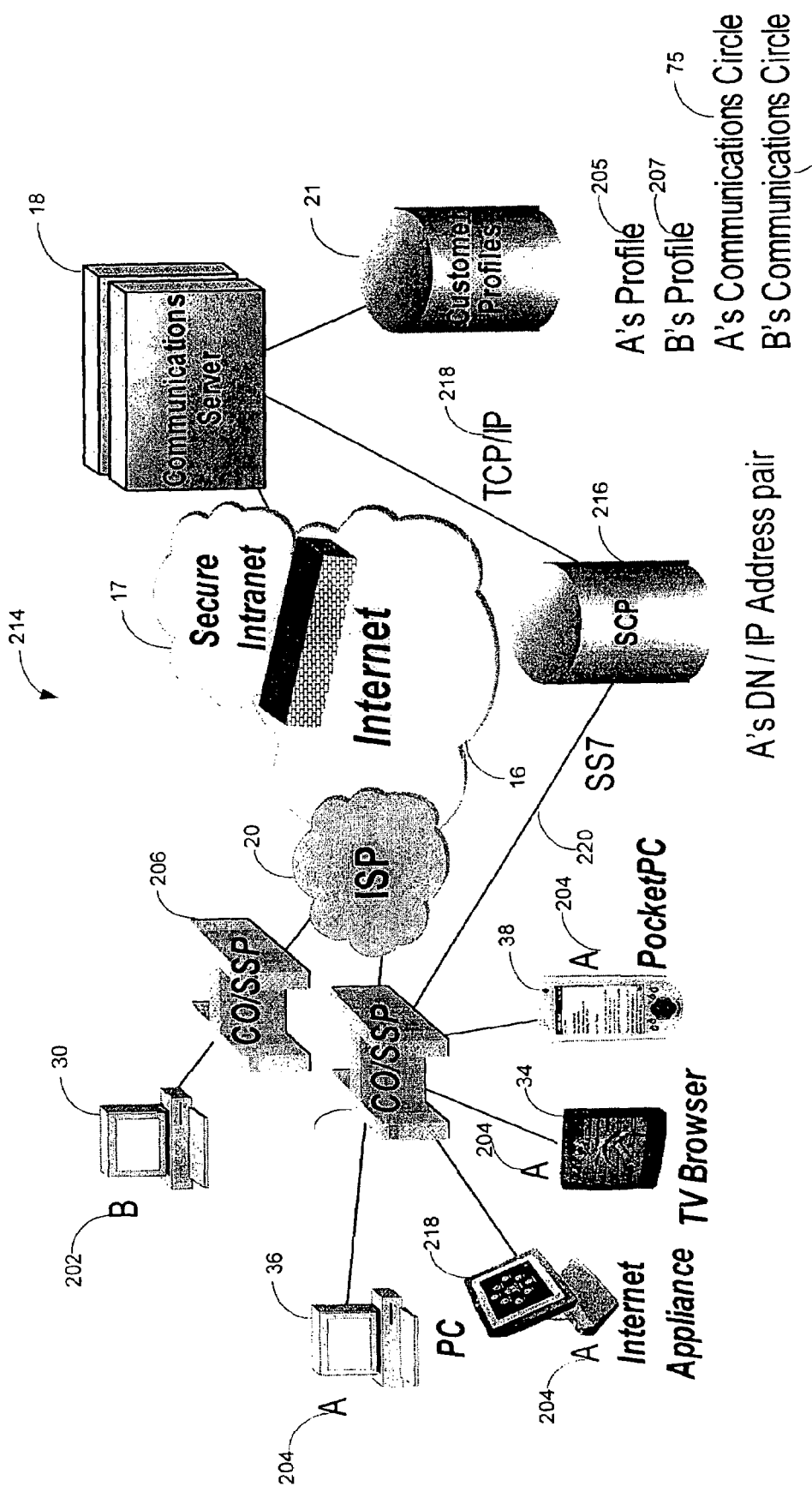
FIG. 7 is an illustration of an architecture for a wireline data communication system in accordance with the system of FIG. 1.

FIG. 7 is an illustration of an architecture 214 for a wireline data communication system in accordance with the system of FIG. 1. The architecture includes PCs 30, 36, an ISP 20 for connecting with the Internet 16, the Internet 16, communications server 18, customer profiles database 21, SCP 216, and contact devices 22 utilized by A 204. A 204 has access to a number of dial-up Internet access equipment, for example, a PC 36, an Internet appliance 218, a Television (TV) browser 34, and Pocket PC 38.

The Internet appliance 218 typically includes a monitor, a keyboard or other input device, and a modem for connecting to the Internet 16 and receiving Email messages. Normally, no processor is provided and the Internet appliance 218 does not include computer programs such as Microsoft Word. A suitable Internet appliance is model I-opener by Netpliance of Austin, Tex. Product information is available at www.netpliance.com.

WebTV Networks, Inc. a subsidiary of Microsoft Corporation makes a suitable television browser 34 for connecting to the Internet 16. Product information is available at www-.webtv.com. All of these devices have access to the Internet 16, browsing capabilities and connects to the ISP 20 to connect the request to the Internet 16. Once the dial-up device is connected to the Internet 16 the communications server 18 is aware of the presence of the contact device 22 and the contact devices 22 can receive Email messages or an instant message.

1. DN/IP Address Setup

FIG. 7 shows a an architecture 214 for establishing an Internet dial number and Internet Protocol address for the system of FIG. 1 to determine the presence of the dial-up devices. B 202 uses a PC 30 as the communication initiator 14. The PC 30 has dial-up access to dial into the central office 206 having a SSP software and AIN capabilities. AIN service operates beyond just the switch, allowing communications service providers to build their own services and are not limited to services offered by the switch manufacturer. Additionally, AIN provides for triggers that interrupt processing a call into the SSP and sends the call using signaling system 7 (SS7) 220, a telephony protocol, to the service control point (SCP) 216. The SCP 216 performs a query outside of the switch and instructs the switch how to process the call.

To begin the call setup, A 204 dials-up their ISP 20 to initiate an Internet 16 session. For instance the telephone number to call to access the ISP 20 is (404) 332-2116. The call is interrupted by an AIN feature code trigger. The dial string for the ISP 20 dial-in number is preceded by a *XX feature code, which corresponds to the AIN feature code trigger on A's 204 telephone line, interrupting the call so that it can be processed differently. For instance, the dialing string may be, for instance, *95,4043322116. The *XX sequence causes an AIN Feature Code trigger resulting in a query to the SCP 216. This query contains A's 204 Internet dialing number (DN)

representing the number A 204 is dialing from, for example (404) 332-1000. The SCP 216 returns a response to the SSP, indicating to the SSP to route the call to the ISP 20 and to notify the SCP 216 when the call ends. Thus a session is established with the ISP 20.

The ISP 20 assigns an Internet Protocol (IP) address to A 204. The IP address is unique to the computer attempting Internet 16 access and encompasses a stream of numbers such that the communications server 18 knows that computer 36 is on the Internet 18, and how to reach that computer 36. A sample IP address is 205.53.81.2. The Internet device, such as the computer 36 sends a message using Internet signaling protocol for data, TCP/IP 218, to the server 18 containing A's 204 Internet DN/IP address pair creating a record. For instance a record =7042540010/205.53.81.2. The PC 36 (or other Internet device) now has assigned an Internet DN/IP address pair and communications server 18 becomes aware of A's 204 record information and that A's PC 36 is connected to the Internet 16. It is now possible to send an email based text message, such as an instant message, to A 204 or send an Email message to A 204.

When A 204 terminates an Internet 16 session, the SSP sends a TCAP AIN 0.1 message to the SCP 216 containing A's Internet DN. Upon receipt of the TCAP AIN 0.1 message, the SCP 216 clears the DN/IP address pair from its database.

2. Determining A's Communications Presence

In the example shown in FIG. 7, A 204 could be on a number of different possible types of dial-up Internet access equipment. The communications server 18 queries the SCP 216, based on the Internet DN in A's profile, via the TCP/IP 218 to determine whether A 204 has an active IP address. If A 204 has a DN/IP address pair in the SCP 216, then A 204 has an active IP address. The IP address from the address pair is returned to the communications server 18. The communications server 18 displays to B 202 via B's PC 30 that A 204 is on-line and offers B 202 the option to send an Instant Message to A 204 or an Email to A 204.

E. Wireless Email/Pager

Figure 8:
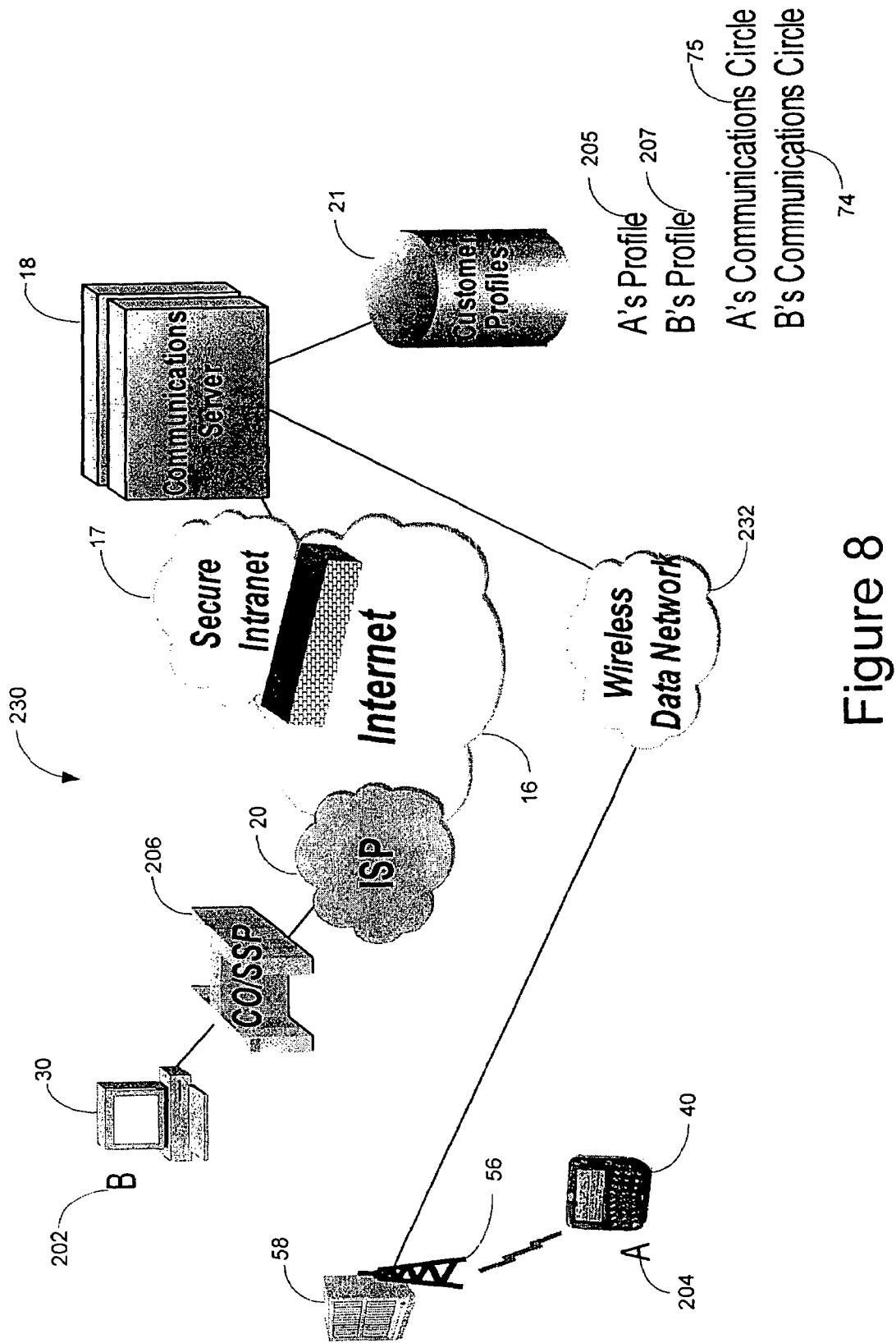
FIG. 8 is an illustration of an architecture for a wireless Email and pager communication system in accordance with the system of FIG. 1.

FIG. 8 is an illustration of an architecture 230 for a wireless Email and pager communication system in accordance with the system of FIG. 1. The architecture includes B's PC 30, an ISP 20 for connecting to the Internet 16, the Internet 16, the communications server 18, customer profiles database 21, a MSC 58 coupled to a radio tower 56, and A's pager 40.

To determine the if A's pager 40 is accessible, the communications server 18 sends a query to the wireless data network 232. In response to this query, the wireless data network 232 queries the pager 40 to see if it is activated and can receive a page. The precise way in which the wireless data network 232 queries the pager 40 will vary with the network 232 itself and the pager 40. As one example, when the pager 40 is an interactive pager manufactured by Research In Motion (RIM) of Waterloo, Ontario, the paging network can ping the pager 40 with an on/off message to see if it is active. The paging network uses the Mobitex Access Number, which is shown above in Table 1, to perform this pinging operation. If the pager 40 is on, then the pager 40 respond to the on/off message with an "on" reply. This querying is transparent to A 204. The wireless data network 232 then responds to the communications server 18 by informing it whether the pager 40 is activated.

The communications server 18 then takes the information learned from the wireless data network 232 to update A's communications presence. If A's pager 40 is on, this status is displayed to B 202 via the personalized Internet interface 70 and B 202 is given the option of sending a page to A 204.

3. Communications Receipt Preference

Figure 9:
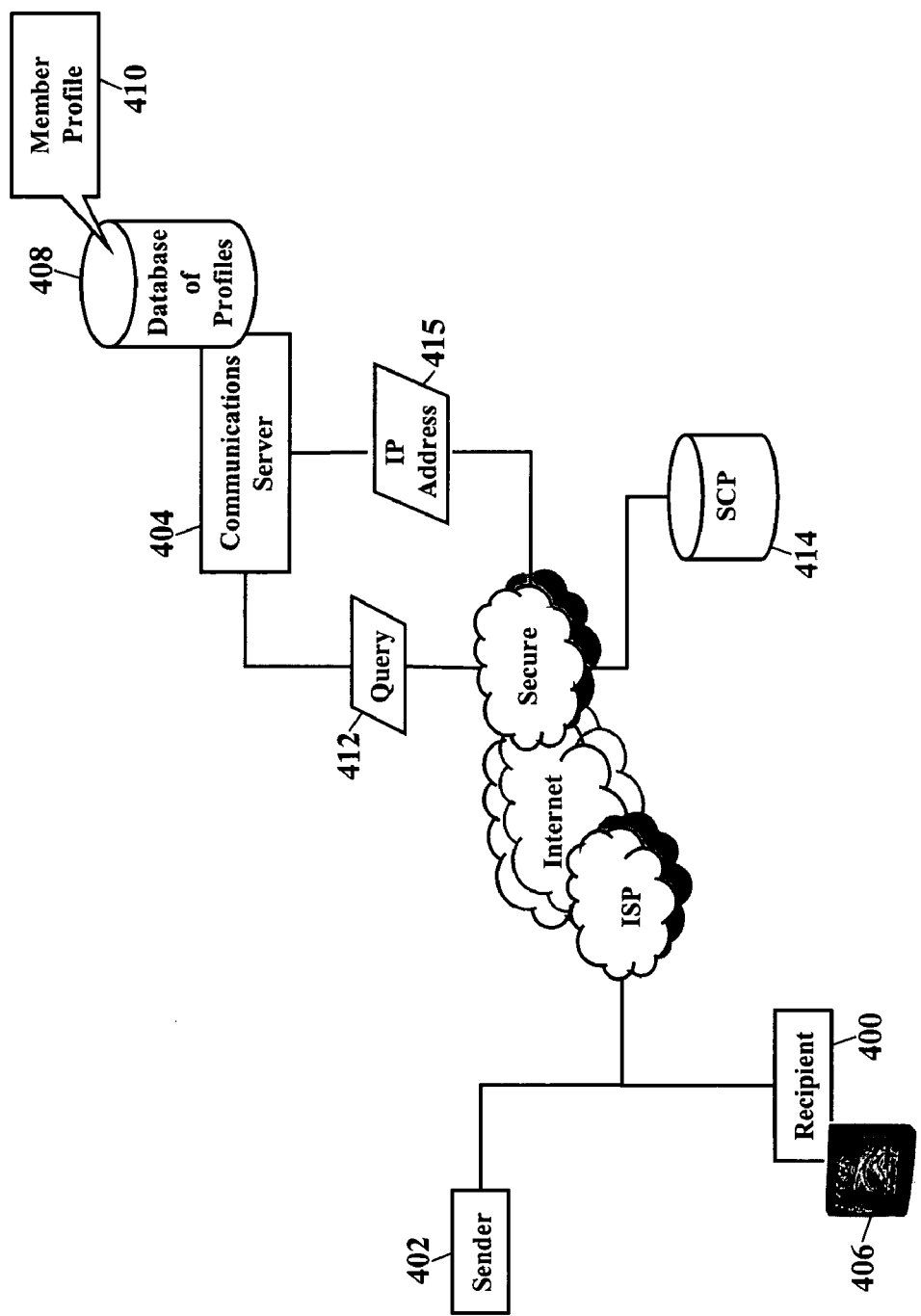
FIG. 9 is a schematic illustrating shared communication preference information for wireline data communications.

FIG. 9 is a schematic illustrating shared communication preference information for wireline data communications. FIG. 9 illustrates how a recipient 400 of a communication may indicate a preferred communication device and/or medium when a sender 402 initiates communication. The communications receipt preference may be used in a communications circle, where members of the communications circle indicate to other members, and even to non-members, how the member prefers to receive communications. Even though each member may have multiple, available contact devices and/or mediums, the exemplary embodiments allow each member to indicate a preferred contact device or medium when receiving communications. Each member, for example, may prefer to receive a textual communication medium (such as email, instant message, page, or fax) or a voice medium (e.g., telephone call). The preferred medium may even be video (e.g., MPEG files). Even though a member may have multiple, available contact devices, the member may prefer to receive communications at a wireless device. Another member, however, may prefer to receive communications at a wireline device, despite having one or more available wireless devices. The communications receipt preference thus allows a recipient to indicate how communications are preferably received.

As FIG. 9 shows, the recipient 400 logs on to a personalized web page stored on, or accessed by, a communications server 404. The recipient 400 accesses the communications server 404 via a connection to a distributed computing network, such as the Internet. The personalized webpage displays to the recipient 400 a shared and an unshared profile section. The unshared portion allows the recipient 400 to set the preferred communication device and/or medium desired when the sender 402 tries to communicate with the recipient. The recipient 400, for example, may select an instant message presented on the recipient's television browser 406 as a preferred communication medium and/or device. Then, when the sender 402 logs in to the communications server 404, the server retrieves the sender's communications circle. The sender's communications circle is stored in a database 408 of profiles. The sender's profile 410 contains a list of code numbers, with each code number used as a pointer to find a corresponding profile of a member of the sender's communications circle. For example, the sender's communications circle contains the code number for the recipient 400, and that code number is used to find the recipient's profile. The communications server 404 queries the database 408 of profiles for the sender's profile and the member profiles of the sender's communications circle. The recipient's profile is then returned to the communications server 404.

The communications server 404 now knows the presence and availability of the recipient 400. Because the recipient's profile is return communicated to the communications server 404, the server knows where the recipient 400 might be, and the server knows on which communication device and/or medium the recipient 400 prefers to be contacted. As FIG. 9 illustrates, in this example the recipient 400 is on one of a number of different possible types of dialup Internet access. The communications server 404 issues a query 412 to determine whether the recipient 400 has an active IP address. The query 412 routes to any computer, server, network device, and/or Internet Service Provider that maps IP addresses. FIG. 9, however, shows the query 412 routing to a service control point (shown as "SCP") 414. The communications server 404 queries the service control point 414 (based on the Internet DN in the recipient's profile) via TCP/IP to determine whether the recipient 400 has an active IP address. This is true if a DN/IP address pair for the recipient 400 exists in the service control point 414. The IP address 415 is returned to the communications server 404. The communications server 404 then causes the sender's communications device to display that the recipient 400 is online and offers sender 402 the option to send an Instant Message or email to the recipient 400. The communications server 404 also causes the sender's communications device to display the recipient's preferred method of communication (which, in this example, is via an Instant Message sent to the recipient's television browser 406).

Figure 10:
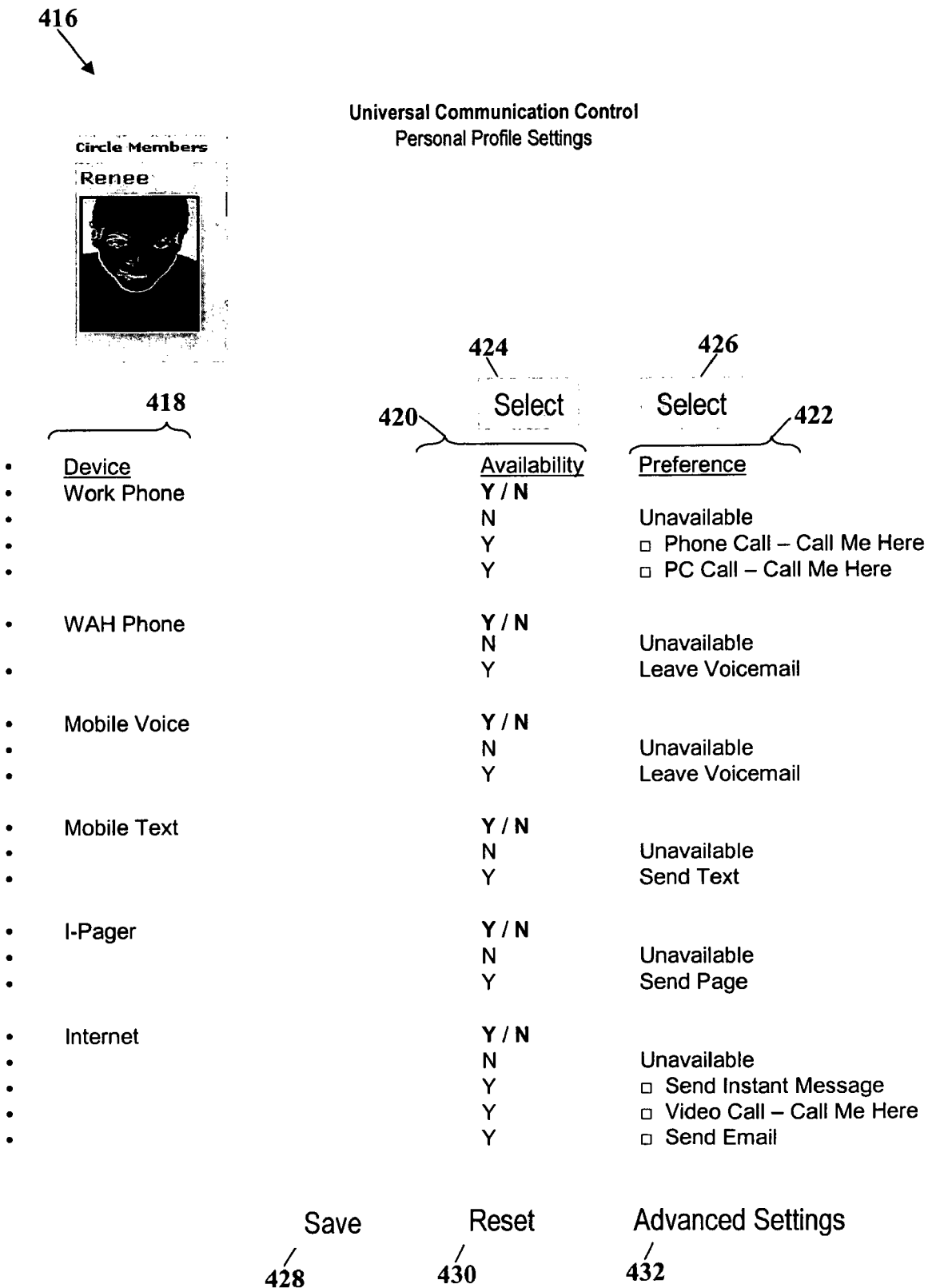
FIG. 10 is a schematic illustrating an example of a personalized web page 416.

FIG. 10 is a schematic illustrating an example of a personalized web page 416. This personalized webpage 416 allows the recipient (shown as reference numeral 400 in FIG. 9) to set the preferred communication device and/or medium desired when the sender (shown as reference numeral 402 in FIG. 9) tries to communicate with the recipient. The personalized web page 416 displays the recipient's shared and/or unshared profile sections. The unshared portion allows the recipient 400 to set the preferred communication device and/or medium desired when the sender 402 tries to communicate with the recipient. The personalized web page 416, and the shared and/or unshared profile sections, may have any look and feel. The personalized web page 416, however, would generally visually and/or audibly present the recipient's communications devices (shown as column 418), their availability (shown as column 420), and a preference for receipt of communications (shown as column 422). A corresponding control button 424 allows the recipient to alter the availability of the communications devices, and another corresponding control button 426 allows the recipient to change the preference(s) for receipt of communications. A "Save" control button 428 saves/stores the profile settings, and a "Reset" control button 430 resets the profile settings to previous or default values. An "Advanced Settings" control button 432 allows the recipient to establish advanced profile settings, as will be further discussed.

Figure 11:
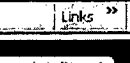
FIG. 11 is an example of a screen display interface 434 showing profile information for members of a communications circle.

FIG. 11 is an example of a screen display interface 434 showing profile information for members of a communications circle. The interface 434 displays public profile information for members "Renee," "Cindy," and "Mary." Using member "Renee" as an example, the screen display interface 434 visually and/or audibly presents Renee's communications devices 436, an availability 438 for each communications device (e.g., whether each communications device is available to receive a communication), and a contact section 440. The contact section 440 presents a graphical indicator for each available contact device that initiates communication with that member. The contact section 440 is shown as a "Click to contact" field 442.

FIG. 11 also shows member Renee's one or more preferences for receipt of communications. Member Renee, again for example, has indicated that she is present at her work phone, and Renee has established a preference 444 for receipt of communications. The preference 444 (e.g., "Call Me Here") indicates that Renee would prefer to receive a telephone call at her work telephone number. Although Renee is also available via an i-pager communications device and via Internet communications, she would prefer to receive a telephone call at work. The contact section 440 may even color code the graphical indicators. Each member's preferred device and/or medium may be colored, highlighted, and/or shaded to visually emphasize the preference. Member Renee, for example, may have her preference highlighted with a green color/font, while unavailable devices/mediums are highlighted in a red color. Other available devices/mediums, while not preferred, may be highlighted with some other color, such as yellow. Fellow members "Cindy" and "Mary" may also indicate respective preferences 446 and 448 for receipt of communications.

Figure 12:
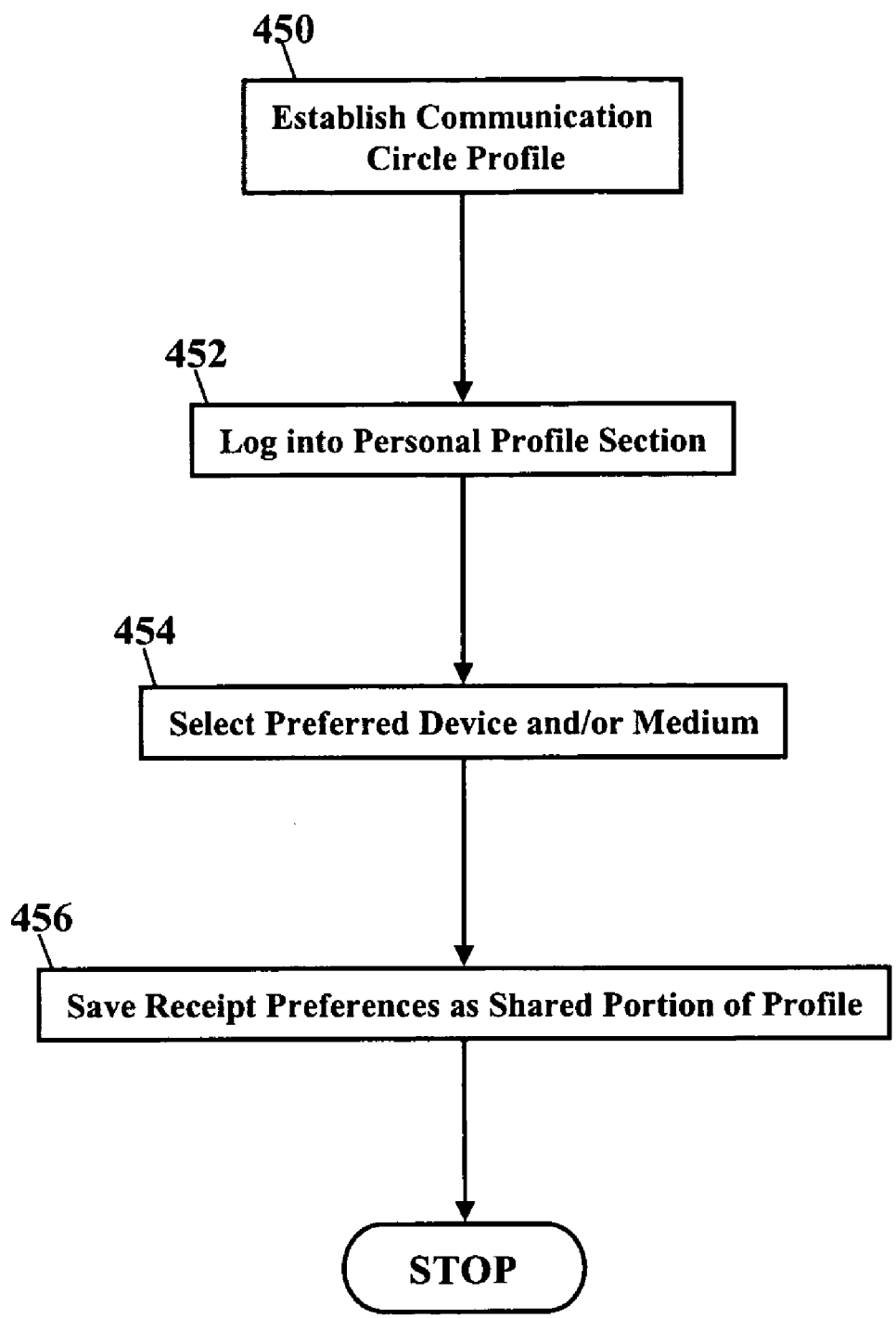
FIG. 12 is a flowchart illustrating a method of indicating a preference for receipt of communications.

FIG. 12 is a flowchart illustrating a method of indicating a preference for receipt of communications. The recipient establishes a profile for a communications circle (Block 450). The recipient would generally access a distributed computing network (such as the Internet) and join a communications circle. The recipient then selects at least one communications device and selects the members of the communications circle. The recipient logs into a personal profile section (Block 452) and selects one or more preferred devices and/or mediums (Block 454). The preferred device may be wireless and/or wireline, and the preferred medium may be text, voice, and/or video. The preferences are saved in a shared portion of the recipient's profile (Block 456).

Figure 13:
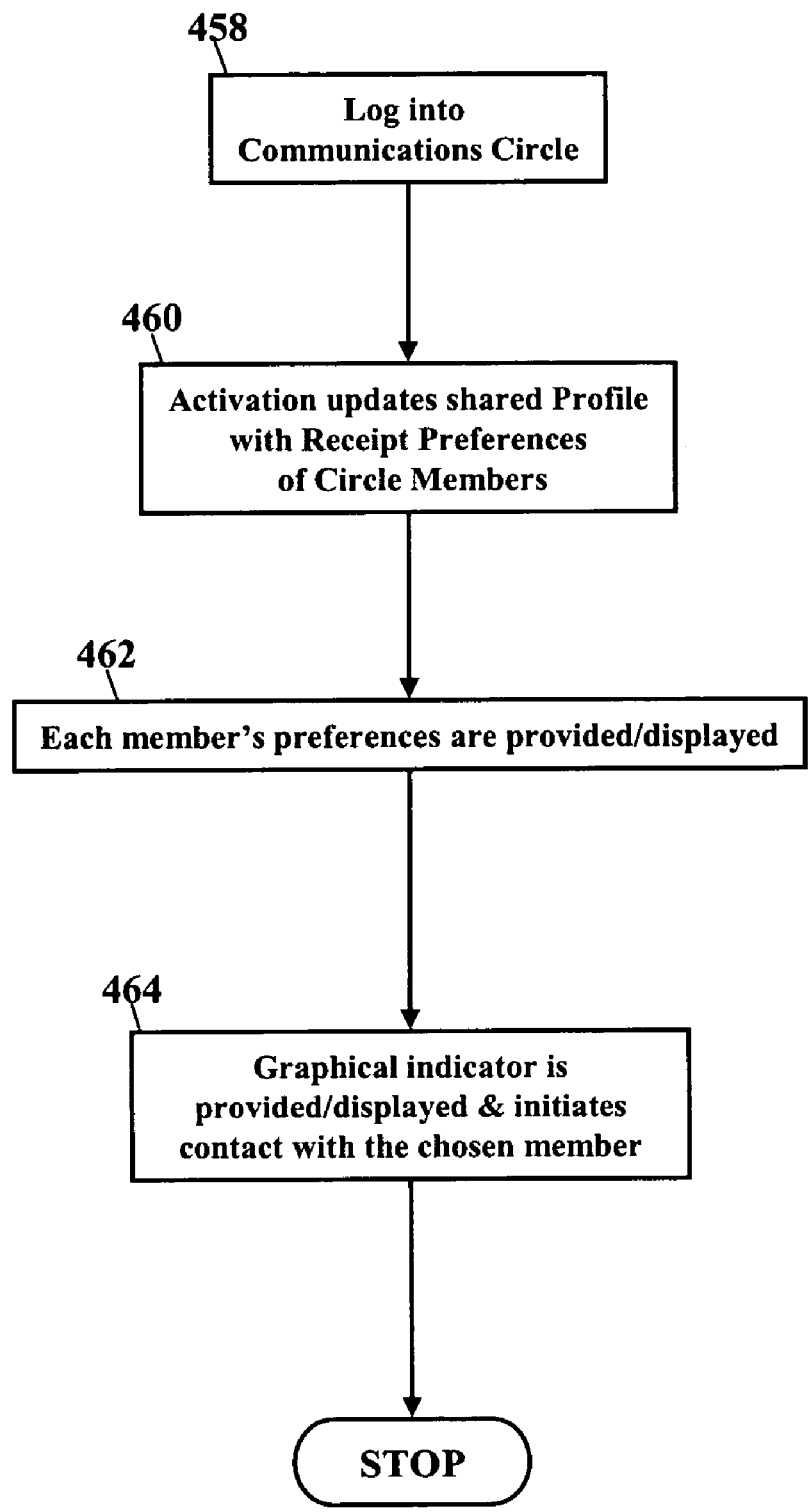
FIG. 13 is a flowchart illustrating another method of indicating a preference for receipt of communications.

FIG. 13 is a flowchart illustrating another method of indicating a preference for receipt of communications. Here a sender or initiator of a communication logs into the communications circle (Block 458). The sender establishes membership in the communications circle and accesses the shared portion of each other member's profile. The sender's activation automatically updates the shared profile with each member's current receipt preferences (Block 460). Each member's shared profile portion indicates their network presence and their preferred communications method. Each member's shared profile portion indicates their preferred device may be wireless and/or wireline, and their preferred medium may be text, voice, and/or video. The member's preferences are displayed (Block 462) and a graphical indicator initiates contact with the member (Block 464).

The exemplary embodiments identify to a sender a communication receipt preference through contact devices. The sender accesses a profile and updates the sender's shared profile. The profile identifies at least one contact device for each member of a communications circle. Information on the profile is provided for each member to the sender, and each member's contact devices are tracked to determine the ability of the contact device to receive a communication for a prospective recipient. A communications receipt preference is set, wherein the communications receipt preference includes specifying a requested medium for a prospective recipient. The shared profile may generate preferences set by communication circle members, and the communication circle members may include the set of prospective recipients. The sender may identify the communication presence and the preference of the prospective recipients.

Another of the exemplary embodiments include an electronic interface for a user of at least one communication device to indicate a communication receipt preference to members of a communications circle. The interface allows recipients to set their communications receipt preference. The interface may also display profile information on each member of the communications circle, with the profile information identifying at least one of contact devices associated with each member, an availability of each of the contact devices, and a communication receipt preference. The interface may be displayed on a computer, on a wireless device, an interactive television, and/or on a personal digital assistant. The interface is used to initiate the sending of a communication using the communication receipt preference as set by the user.

An advantage of this invention is that a determination can be intelligently and efficiently made as to which communications equipment associated with a member of a communications circle is activated.

Another advantage of this invention is that once a determination is made that a member of a communications circle has a communications device available, that member can be immediately contacted.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

The invention claimed is:

1. A method of indicating a preference for receipt of a communication, comprising:
   storing a profile of a user, the profile identifying multiple contact devices for the user;
   providing information on the user's profile to a sender of the communication;
   tracking a communications presence of each contact device for the user, the tracking including determining the availability of each contact device for the user, the determining including:
      retrieving an Internet dialing number from the profile;
      querying to determine whether the user has an active IP address based on the Internet dialing number;
      determining that an active IP address associated with the user exists when an Internet dialing number/IP address pair includes the retrieved Internet dialing number; and
      retrieving the IP address from the Internet dialing number/IP address pair; and
   providing a communication receipt preference to the sender of the communication, the communication receipt preference indicating the user's preference for receipt of the communication at one of the multiple and available communications devices.

2. The method of claim 1, further comprising providing the communication receipt preference to a communications circle.

3. The method of claim 1, wherein the communication receipt preference indicates a preferred medium in which to receive the communication.

4. The method of claim 1, wherein the communication receipt preference indicates a text medium is preferred when receiving the communication.

5. The method of claim 1, wherein the communication receipt preference indicates a voice medium is preferred when receiving the communication.

6. The method of claim 1, wherein the communication receipt preference indicates a video medium is preferred when receiving the communication.

7. The method of claim 1, wherein the communication receipt preference indicates a wireless device is preferred when receiving the communication.

8. The method of claim 1, wherein the communication receipt preference indicates a wireline device is preferred when receiving the communication.

9. A system for indicating a preference for receipt of a communication, comprising:
   a memory and a processor;
   wherein the processor:
   communicates with a database, the database storing a profile of a user, the profile identifying multiple contact devices for the user;
   retrieves the user's profile from the database;
   provides information on the user's profile to a sender of the communication;
   tracks a communications presence of each contact device for the user, the tracking including determining the availability of each contact device for the user, the determining including:
      retrieving an Internet dialing number from the profile;
      querying to determine whether the user has an active IP address based on the Internet dialing number;
      determining that an active IP address associated with the user exists when an Internet dialing number/IP address pair includes the retrieved Internet dialing number; and
      retrieving the IP address from the Internet dialing number/IP address pair; and
   provides a communication receipt preference to the sender of the communication, the communication receipt preference indicating the user's preference for receipt of the communication at one of the multiple and available communications devices,
   wherein, from the communication receipt preference, the sender can initiate contact with the user according to the preference for receipt of the communication.

10. The system of claim 9, wherein the communications server further provides the communication receipt preference to a communications circle.

11. The system of claim 9, wherein the communication receipt preference indicates a preferred medium in which to receive the communication.

12. The system of claim 9, wherein the communication receipt preference indicates a text medium is preferred when receiving the communication.

13. The system of claim 9, wherein the communication receipt preference indicates a voice medium is preferred when receiving the communication.

14. The system of claim 9, wherein the communication receipt preference indicates a video medium is preferred when receiving the communication.

15. The system of claim 9, wherein the communication receipt preference indicates a wireless device is preferred when receiving the communication.

16. The system of claim 9, wherein the communication receipt preference indicates a wireline device is preferred when receiving the communication.

17. A computer program product comprising a computer readable medium storing processor executable instructions for performing a method, the method comprising:
   storing a profile of a user, the profile identifying multiple contact devices for the user; providing information on the user's profile to a sender of the communication;
   tracking a communications presence of each contact device for the user, the tracking including determining the availability of each contact device for the user, the determining including:
      retrieving an Internet dialing number from the profile;
      querying to determine whether the user has an active IP address based on the Internet dialing number;
      determining that an active IP address associated with the user exists when an Internet dialing number/IP address pair includes the retrieved Internet dialing number; and
      retrieving the IP address from the Internet dialing number/IP address pair; and
   providing a communication receipt preference to the sender of the communication, the communication receipt preference indicating the user's preference for receipt of the communication at one of the multiple and available communications devices.

* * * * *